US010073263B2

(12) United States Patent
Katz et al.

(10) Patent No.: US 10,073,263 B2
(45) Date of Patent: Sep. 11, 2018

(54) SPARSE PROJECTION FOR A VIRTUAL REALITY SYSTEM (71) Applicant: Oculus VR, LLC, Menlo Park, CA (US)

(72) Inventors: Dov Katz, Irvine, CA (US); Palmer Freeman Luckey, Long Beach, CA (US); Samuel Redmond D'Amico, Irvine, CA (US); Evan M. Richards, Santa Clara, CA (US); Shizhe Shen, San Mateo, CA (US); Jennifer Leigh Dolson, Menlo Park, CA (US)

(73) Assignee: Oculus VR, LLC, Menlo Park, CA (US)

( * ) Notice: Subject to any disclaimer, the term of this patent is extended or adjusted under 35 U.S.C. 154(b) by 225 days.

(21) Appl. No.: 15/060,686

(22) Filed: Mar. 4, 2016

(65) Prior Publication Data

US 2016/0259168 A1    Sep. 8, 2016

Related U.S. Application Data (60) Provisional application No. 62/128,433, filed on Mar. 4, 2015.

(51) Int. Cl.
*H04N 5/89* (2006.01)
*G02B 27/01* (2006.01)
(Continued)

(52) U.S. Cl.
CPC ....... *G02B 27/0172* (2013.01); *G02B 27/017* (2013.01); *G03B 21/14* (2013.01);
(Continued)

(58) Field of Classification Search
CPC ... G02B 27/0172; G02B 27/017; G03B 21/14
(Continued)

(56) References Cited

U.S. PATENT DOCUMENTS 8,847,850 B1     9/2014  Cho
2006/0238843 A1*  10/2006  Schwerdtner ............ G03H 1/08
                                                      359/15
(Continued)

FOREIGN PATENT DOCUMENTS

JP    2014-106642 A    6/2014

OTHER PUBLICATIONS

PCT International Search Report and Written Opinion, PCT Application No. PCT/US2016/020814, dated Jul. 13, 2016, 5 pages.

*Primary Examiner* — Farzana Hossain
(74) *Attorney, Agent, or Firm* — Fenwick & West LLP (57) ABSTRACT A virtual reality (VR) includes a sparse projection system configured to generate a plurality of clusters using one or more diffractive optical elements. Each generated cluster has a unique configuration that corresponds to a unique location in a virtual mapping of a local area. The sparse projection system projects the generated clusters throughout the local area. A VR console receives a series of images of the local area from the imaging device, with at least one image includes at least one cluster. The VR console determines a location of a VR headset within the virtual mapping of the local area based at least in part on a configuration of the at least one cluster included in the series of images. Content is generated based at least in part on the determined location of the VR headset and is provided to the VR headset for presentation.

28 Claims, 5 Drawing Sheets (51) Int. Cl.
  *G06T 19/00* (2011.01)
  *G06F 3/01* (2006.01)
  *G03B 21/14* (2006.01)

(52) U.S. Cl.
  CPC ............ *G06F 3/011* (2013.01); *G06T 19/006* (2013.01); *G02B 2027/014* (2013.01); *G02B 2027/0138* (2013.01); *G02B 2027/0174* (2013.01); *G02B 2027/0187* (2013.01)

(58) Field of Classification Search
  USPC .......................................................... 348/40
  See application file for complete search history.

(56) References Cited

U.S. PATENT DOCUMENTS

| | | | |
|---|---|---|---|
| 2014/0063061 A1* | 3/2014 | Reitan | G09G 3/003 345/633 |
| 2014/0098379 A1 | 4/2014 | Smits | |
| 2014/0191929 A1 | 7/2014 | Kim | |
| 2014/0320531 A1 | 10/2014 | Elvesjö | |
| 2015/0253574 A1* | 9/2015 | Thurber | G02B 27/0172 359/630 |
| 2015/0261291 A1* | 9/2015 | Mikhailov | G06F 3/012 345/156 |
| 2015/0370075 A1* | 12/2015 | Ato | G02B 27/017 359/240 |

* cited by examiner

SPARSE PROJECTION FOR A VIRTUAL REALITY SYSTEM

CROSS-REFERENCE TO RELATED APPLICATIONS

This application claims the benefit of U.S. Provisional Patent Application No. 62/128,433, filed Mar. 4, 2015, the disclosure of which is hereby incorporated by reference in its entirety.

BACKGROUND

The present disclosure generally relates to virtual reality systems, and more specifically relates to projection systems for virtual reality systems.

Virtual reality (VR) systems include components for determining position and movement of a VR headset worn by a user. Conventional VR systems determine position and movement of a VR headset through active devices (e.g., light emitting diodes) that emit light used by the VR system to track the location of the VR headset. However, using active components to track position and movement VR headsets increases the complexity of design and manufacture of VR headsets.

SUMMARY

A virtual reality (VR) system includes a VR headset including an imaging device, a sparse projection system, and a VR console. The sparse projection system generates a plurality of clusters using one or more diffractive optical elements and projects the clusters throughout a local area including the sparse projection system. Each cluster has a unique location configuration that corresponds to a unique location in a virtual mapping of the local area including the sparse projection system. The VR headset includes an imaging device configured to capture a series of images of portions of the local area, with one or more of the images including at least one cluster. Additionally, the VR headset includes an electronic display configured to output content based at least in part on the virtual mapping of the local area. The VR console receives the series of images from the imaging device of the VR headset and determines a location of the VR headset within the virtual mapping of the local area based at least in part on a location configuration of the at least one cluster in the series of images. For example, based at least in part on the determined location of the VR headset within the virtual mapping of the local area, the VR console generates content that is provided to the VR headset for presentation by the electronic display.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
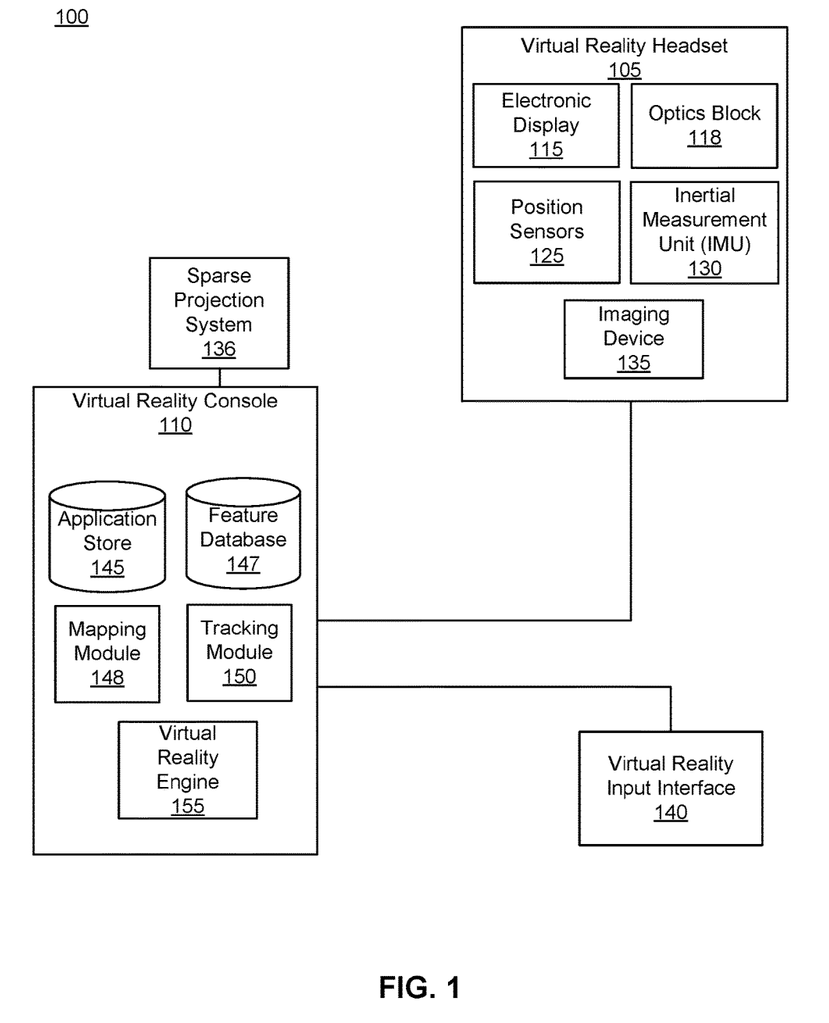
FIG. 1 is a block diagram of a system environment including a virtual reality system, in accordance with an embodiment.

FIG. 1 is a block diagram of a virtual reality (VR) system environment 100 in which a VR console 110 operates. The system environment 100 shown by FIG. 1 comprises a VR headset 105 that includes an imaging device 135, a sparse projection system 136, and a VR input interface 140 that are each coupled to the VR console 110. While FIG. 1 shows an example system environment 100 including one VR headset 105, one sparse projection system 136, and one VR input interface 140, in other embodiments any number of these components may be included in the system environment 100. For example, there may be multiple sparse projection systems 136 projecting a plurality of clusters in a local area including the sparse projection system 136, which the VR headset 105 and/or the VR input interface 140 use to orient themselves within a virtual mapping of the local area. In the preceding example, each VR headset 105, VR input interface 140, sparse projection system 136, and imaging device 135 communicates with the VR console 110. In alternative configurations, different and/or additional components may be included in the system environment 100.

The sparse projection system 136 includes one or more sparse projectors that generate and project a plurality of clusters throughout a local area that includes the sparse projection system 136. In some embodiments, the sparse projection system 136 includes one or more light sources that emit coherent light at specific bands (e.g., a range of wavelengths of light). Example bands of light emitted by one or more light sources in the sparse projection system 136 include a visible band (~380 nm to 750 nm), an infrared (IR) band (~750 nm to 1 mm), an ultraviolet band (10 nm to 380 nm), another portion of the electromagnetic spectrum, or some combination thereof. For example, a light source in the sparse projection system 136 is a laser producing light in the IR band. To generate the plurality of clusters, one or more diffractive optical elements are illuminated by the one or more light sources in the sparse projection system 136. The generated plurality of clusters are then projected into the local area by the sparse projection system 136. Sparse projection systems 136 are further described below in conjunction with FIGS. 4 and 5.

A cluster is a unique pattern or configuration of illuminated regions that corresponds to a unique location in a virtual mapping of the local area including the sparse projection systems 136. Hence, different clusters are associated with different locations in the virtual mapping of the local area, which is a real world environment onto which the sparse projection system 136 projects the clusters. For example, a local area is an interior of a room enclosing a sparse projection system 136 that projects clusters onto one or more surfaces within the room. Each cluster includes various illuminated regions that have a unique location configuration, which describes a spatial configuration of a cluster and a reflectance type of the cluster. The spatial configuration of a cluster describes a number and an arrangement of illuminated regions within the cluster, while the reflectance type specifies a band of light (e.g., a range of wavelengths of light) used to generate the cluster. No two clusters have the same unique location configuration. For example, each cluster has a different spatial configuration, but have a common reflectance type. Alternatively, multiple clusters may have the same spatial configuration but have different reflectance types.

The VR headset 105 is a head-mounted display that presents content to a user. Examples of content presented by the VR headset 105 includes one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIG. 2. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the VR headset 105 may also act as an augmented reality (AR) headset and/or a mixed reality (MR) headset. In these embodiments, the VR headset 105 augments views of a physical, real-world environment with computer-generated content (e.g., images, video, sound, etc.).

In some embodiments, the VR headset 105 includes an electronic display 115, an optics block 118, one or more position sensors 125, an inertial measurement unit (IMU) 130, and an imaging device 135. The electronic display 115 displays images to the user in accordance with data received from the VR console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The optics block 118 magnifies received image light, corrects optical errors associated with the image light, and presents the corrected image light to a user of the VR headset 105. In various embodiments, the optics block 118 includes one or more optical elements. Example optical elements included in the optics block 118 include: an aperture, a Fresnel lens, a convex lens, a concave lens, a filter, or any other suitable optical element that affects image light. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the content presented by the electronic display 115. For example, the field of view of the displayed content is such that the displayed content is presented using almost all (e.g., 110 degrees diagonal), and in some cases all, of the user's field of view. In some embodiments, the amount of magnification may be adjusted by adding or removing optical elements.

The optics block 118 may be designed to correct one or more types of optical error. Examples of optical error include two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 115 for display is pre-distorted, so the optics block 118 corrects the distortion when it receives image light from the electronic display 115 generated based on the content.

The IMU 130 is an electronic device that generates fast calibration data indicating an estimated position of the VR headset 105 relative to an initial position of the VR headset 105 based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals generated by the one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals from various position sensors 125 and calculates the estimated position of the VR headset 105 from the sampled data. For example, the IMU 130 integrates the measurement signals received from one or more accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so the initial position of the reference point corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 captures one or more images of the local area including the VR headset 105, with at least a set of the captured images including at least one cluster. In various embodiments, the imaging device 135 may include one or more cameras, one or more video cameras, any other device capable of capturing images of the clusters, or some combination thereof. Additionally, the imaging device 135 may include one or more filters (e.g., for increasing signal to noise ratio). The imaging device 135 is configured to detect clusters in a field of view of the imaging device 135. In various embodiments, the images captured by the imaging device 135 are slow calibration data that is communicated from the imaging device 135 to the VR console 110. The imaging device 135 receives one or more calibration parameters from the VR console 110 to adjust one or more imaging parameters (e.g., focal length, focus, frame rate, ISO, sensor temperature, shutter speed, aperture, etc.) for capturing images of the local area. In alternate embodiments, the imaging device 135 is separate from the VR headset 105.

The VR input interface 140 is a device that allows a user to send action requests to the VR console 110. An action request is a request to perform a particular action. For example, an action request may be to start an application, to end an application, or to perform a particular action within the application. The VR input interface 140 may include one or more input devices. Example input devices include: a keyboard, a mouse, a game controller, a joystick, a yoke, or any other suitable device for receiving action requests and communicating the received action requests to the VR console 110. An action request received by the VR input interface 140 is communicated to the VR console 110, which performs an action corresponding to the action request. In some embodiments, the VR input interface 140 may also include an imaging device 135 that captures images of one or more clusters and provides the images to the VR console 110.

The VR input interface 140 may also include an IMU 130 that captures fast calibration data indicating an estimated position of the VR input interface 140 relative to an initial position of the VR interface 140 and provides the fast calibration data to the VR console 110. The IMU 130 receives one or more calibration parameters from the VR console 110. As further discussed below, the one or more calibration parameters are used to maintain tracking of the VR interface 140.

The VR input interface 140 may provide haptic feedback to the user in accordance with instructions received from the VR console 110 in some embodiments. For example, haptic feedback is provided to the user when an action request is received. As another example, the VR input interface 140 provides haptic feedback to the user when the VR console 110 communicates instructions to the VR input interface 140 causing the VR input interface 140 to generate haptic feedback when the VR console 110 performs an action.

The VR console 110 provides content to the VR headset 105 for presentation to the user in accordance with information received from one or more of: the imaging device 135, the VR headset 105, and the VR input interface 140. In the example shown in FIG. 1, the VR console 110 includes an application store 145, a feature database 147, a mapping module 148, a tracking module 150, and a virtual reality (VR) engine 155. Some embodiments of the VR console 110 have different components than those described in conjunction with FIG. 1. Similarly, the functions further described below may be distributed among components of the VR console 110 in different manners than described here in various embodiments.

The application store 145 stores one or more applications for execution by the VR console 110. An application is a group of instructions, that when executed by a processor, generates content for presentation to the user. Content generated by an application may be in response to inputs received from the user via movement of the VR headset 105 or of the VR interface device 140. Examples of applications include: gaming applications, conferencing applications, video playback application, or other suitable applications.

The feature database 147 stores a mapping of cross ratios to corresponding clusters in a virtual mapping of the local area. A cross ratio of a cluster is based on distances between various illuminated regions within the cluster. For example, a cross ratio of a cluster is determined from distances between pairs of coplanar illuminated regions within the cluster. As a specific example, for a cluster, a product of a distance between a first illuminated region and a second illuminated region and a distance between a third illuminated region and a fourth illuminated region is determined as well as an additional product of a distance between the first illuminated region and the fourth illuminated region and a distance between the third illuminated region and the second illuminated region. A cross ratio for the cluster is determined as a ratio of the product to the additional product, with the cross ratio stored in the feature database 147 in association with a cluster identifier associated with the cluster. Additionally, in some embodiments, a cross ratio is also associated with a reflectance type (e.g., a particular band in the IR). Accordingly, in some embodiments, a cross ratio and an additional cross ratio have the same spatial configurations, but have different reflectance types, so the cross ratio and the additional cross ratio map to different areas in the local area. Each cluster in a virtual mapping of a local area is uniquely identified by a cluster identifier. Hence, the feature database 147 stores a mapping between various cluster identifiers and their respective cross ratios.

The mapping module 148 generates a virtual mapping of the local area based on the images of projected clusters received from the VR headset 105 or from the VR input interface 140. Additionally, the mapping module 148 determines a location of each cluster in the local area relative to the sparse projection system 136 and to the VR headset 105. For example, the mapping module 148 uses slow calibration information (e.g., images of portions of the local area) from the VR headset 105 to calculate distances from imaged clusters to the VR headset 105. From the information received from the VR headset 105 and the cluster information from the sparse projection system 136, the mapping module 148 generates a virtual mapping by assigning each cluster to a specific location in a virtual space that overlays the local area via the cluster identifiers associated with different clusters.

The tracking module 150 calibrates the system environment 100 using one or more calibration parameters and may adjust one or more calibration parameters to reduce error in determination of the position of the VR headset 105. For example, the tracking module 150 adjusts the focus of the imaging device 135 to obtain a more accurate position for observed clusters. Moreover, calibration performed by the tracking module 150 also accounts for information received from the IMU 130 in the VR headset 105 or in the VR input interface 140. Additionally, if tracking of the VR headset 105 or of the VR input interface 140 is lost (e.g., the imaging device 135 loses line of sight of at least a threshold number of clusters), the tracking module 150 may re-calibrate some or all of the system environment 100.

The tracking module 150 tracks movements of the VR headset 105 or the VR input device 140 using slow calibration information from one or more imaging devices 135. For example, the tracking module 150 determines a position of a reference point of the VR headset 105 in the virtual mapping using at least one observed cluster from the slow calibration information and the feature database 147. For example, the tracking module 150 determines a cross ratio of the observed cluster and compares the determined cross ratio to cross ratios stored in the feature database 147. The tracking module 150 identifies a cluster identifier from the feature database 147 associated with a cross ratio matching the determined cross ratio then determines a location in the local area corresponding to the identified cluster identifier from the mapping module 148. In embodiments where the VR input interface 140 includes an imaging device 135, the tracking module 150 determines a location of the VR input interface 140 in a similar manner to that described above for the VR headset 105.

The tracking module 150 may also determine positions of the reference point of the VR headset 105 or a reference point of the VR input interface 140 using position information from the fast calibration information. Additionally, in some embodiments, the tracking module 150 may use portions of the fast calibration information, the slow calibration information, or some combination thereof, to predict a future location of the VR headset 105 or a future location of the VR input interface 140. The tracking module 150 provides the estimated or predicted future position of the VR headset 105 or of the VR input interface 140 to the VR engine 155.

The VR engine 155 executes applications within the system environment 100 and receives position information, acceleration information, velocity information, predicted future positions, or some combination thereof, of the VR headset 105 from the tracking module 150. Based on the received information, the VR engine 155 determines content to provide to the VR headset 105 for presentation to the user. Content may include video information, one or more images, virtual objects, audio information, or some combination thereof. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2:
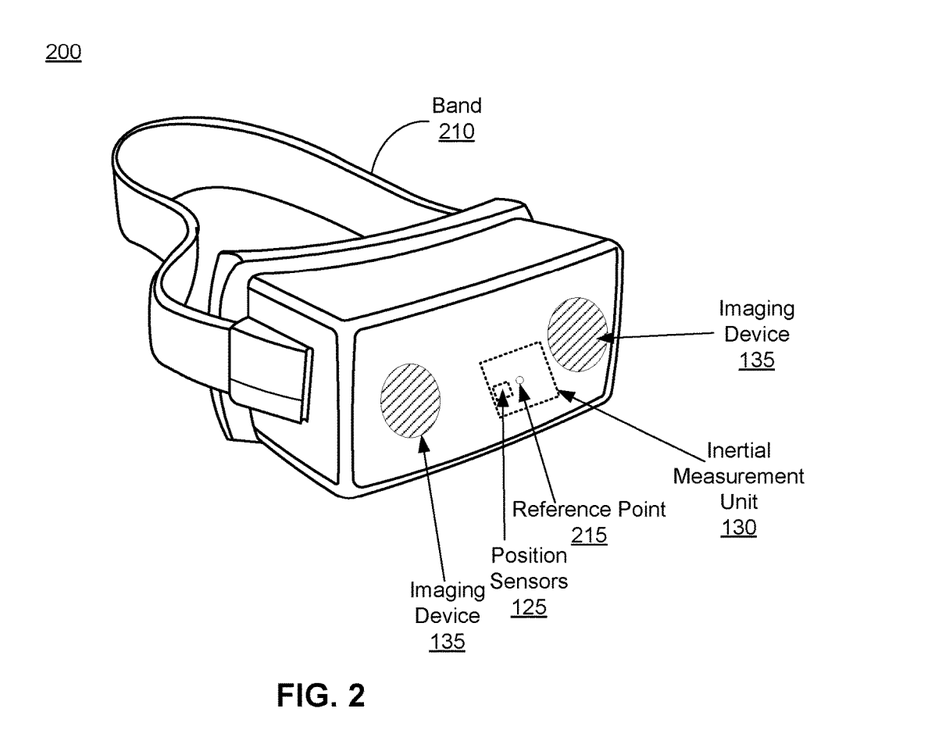
FIG. 2 is a wire diagram of a virtual reality headset, in accordance with an embodiment.

FIG. 2 is a wire diagram of a virtual reality (VR) headset 200, in accordance with an embodiment. The VR headset 200 is an embodiment of the VR headset 105, and includes a front rigid body 205 and a band 210. The front rigid body 205 includes one or more electronic display elements of the electronic display 115 (not shown), the IMU 130, the one or more position sensors 125, and the imaging device 135. In some embodiments, the imaging device 135 is two different cameras, so separated images produced by the two cameras are used to determine distance from the VR headset 200 to a cluster projected by the sparse projection system 136 imaged by both cameras. In alternate embodiments, the imaging device 135 is a single camera that includes a range finder for determining distance to a cluster projected by the sparse projection system 136 being imaged. Additionally, in alternate embodiments, one or more imaging devices may be separate from the VR headset 200. For example, one or more imaging devices may be configured to view the local area including the VR headset 200 from different vantage points.

Figure 3:
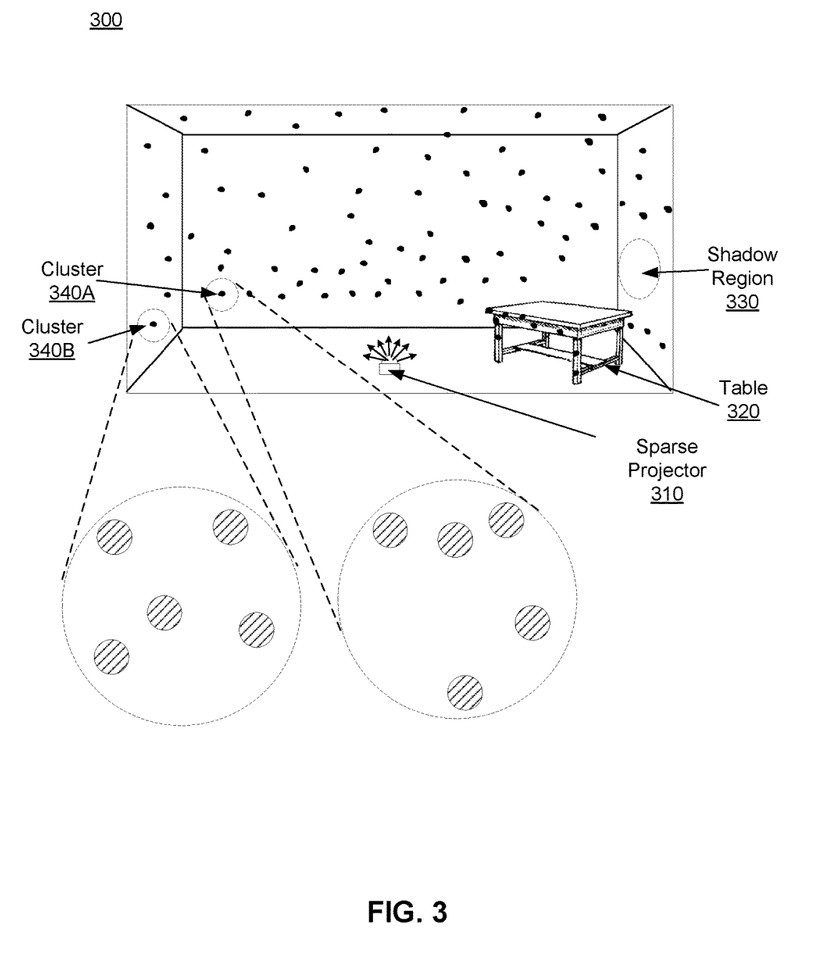
FIG. 3 is an example of a local area being illuminated by a sparse projection system, in accordance with an embodiment.

FIG. 3 is an example of illumination of a local area 300 by a sparse projection system 136. In the example of FIG. 3, the local area 300 includes a sparse projector 310 that generates and projects a plurality of clusters 340 throughout the local area 300. As described above in conjunction with FIG. 1, each cluster has a unique location configuration describing a spatial configuration and a reflectance type of a cluster. For example, cluster 340A has a spatial configuration that is different from the spatial configuration of cluster 340B. As another example, cluster 340A and cluster 340B have a common spatial configuration but different reflectance types. As described above in conjunction with FIG. 1, because each cluster corresponds to a unique location in the virtual mapping of the local area 300, capturing an image including a single cluster allows identification of a location of the VR headset 105 within the virtual mapping of the local area 300.

In some instances, the local area 300 includes one or more items (chairs, tables, couches, people, etc.). In the example of FIG. 3, the local area 300 includes a table 320 onto which the sparse projector 310 projects certain clusters. The positioning of the table 320 relative to the sparse projector 310 creates a shadow region 330 behind the table 310 where no clusters 340 are projected. In some embodiments, to project clusters 340 into the shadow region 310, one or more additional sparse projectors 310 are included in the local area 300 at different locations. For example, including a second sparse projector mounted to the ceiling above the table 320 in the local area 300 of FIG. 3 projects clusters into the shadow region 330, allowing the VR console 110 to generate a better virtual mapping of the local area 300.

Figure 4:
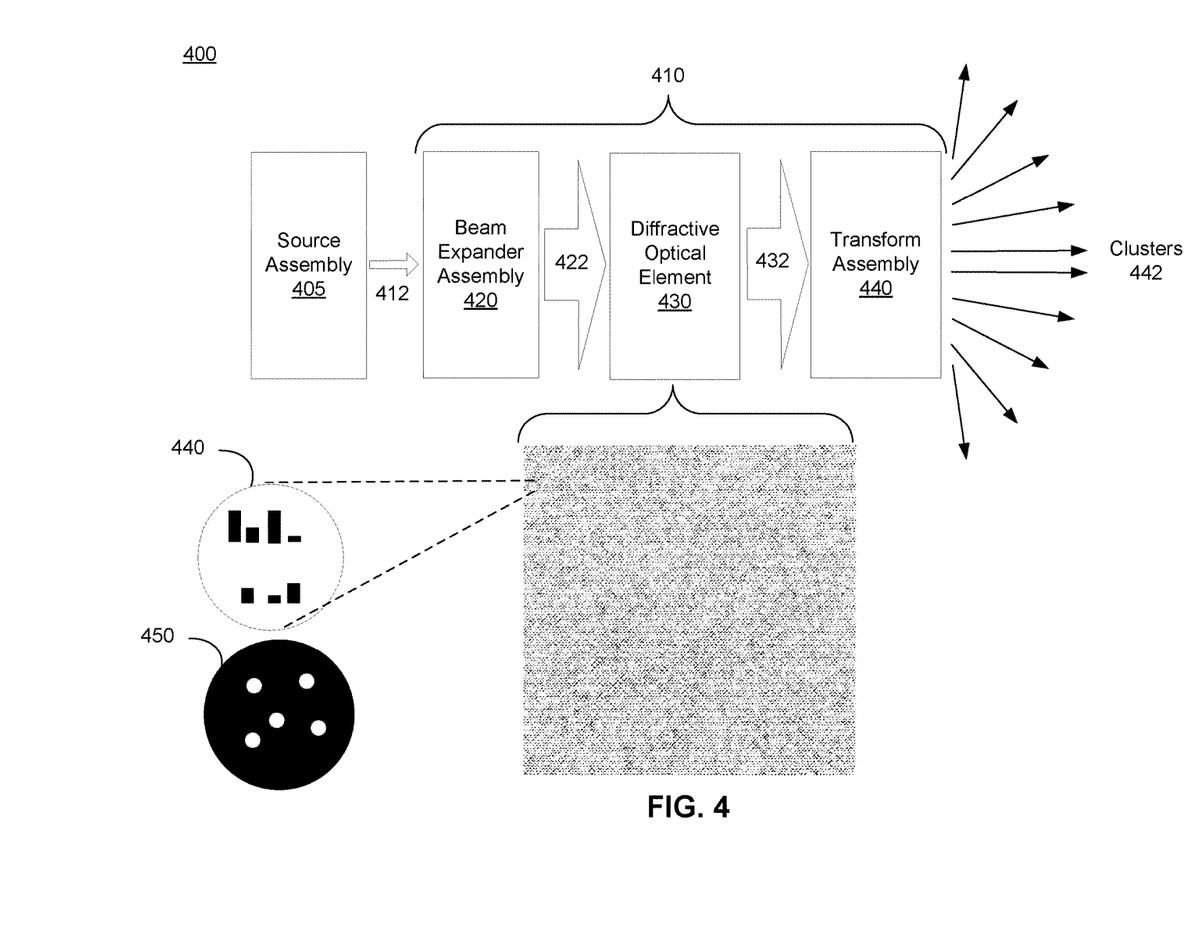
FIG. 4 is a sparse projector including a projection assembly, in accordance with an embodiment.

FIG. 4 is a block diagram of an embodiment of a sparse projector 400 including a projection assembly 410. In the embodiment shown in FIG. 4, the sparse projector 400 includes a source assembly 405 and a projection assembly 410. The source assembly 405 is a coherent light source configured to emit a coherent beam of light 412 directed to the projection assembly 410. Examples of the source assembly 405 include a laser diode, a vertical cavity surface emitting laser, a tunable laser, or another light source that emits coherent light. In various embodiments, the source assembly 405 emits light in the IR band; however, in other embodiments, the source assembly 405 emits light in the visible band, in the UV band, or in any other suitable band. In some embodiments, the beam of light 412 may be relatively collimated. However, in some embodiments, the source assembly 405 emits a beam of light 412 that is not collimated. For example, the light emitted by the source assembly 405 may be diverging or converging. Hence, in some embodiments, the source assembly 405 also includes a collimator that collimates light from a light source into the beam of light 412.

The projection assembly 410 receives the beam of light 412 emitted from the source assembly 405 and outputs a plurality of clusters. In one embodiment, the projection assembly 410 includes a beam expander assembly 420, a diffractive optical element 430, and a transform assembly 440. However, in other embodiments, the projection assembly 410 may include different and/or additional components than those described in conjunction with FIG. 4.

The beam expander assembly 420 expands the beam of coherent light 412 received from the source assembly 405 to generate an expanded beam of light 422 having dimensions sufficient to fully illuminate the diffractive optical element 430. The beam expander assembly 420 may be Galilean, Keplarian, or some other structure configured to generate an expanded beam of light 422 that fully illuminates the diffractive optical element 430 from the beam 412. In some embodiments, a single diffractive optical element 430 may be deposited on a substrate so the beam of coherent light 412 illuminates just the single diffractive optical element 430. In other embodiments, the substrate may include multiple diffractive optical elements 430 that each correspond to different sets of clusters, so the beam of coherent light 412 simultaneously illuminates some or all of the multiple diffractive optical elements 430.

The diffractive optical element 430 is a two-dimensional (2D) Fourier transform of the plurality of clusters for projection into the local area. In various embodiments, the diffractive optical element 430 is a computer generated hologram generated using computer generated holography, such as Fourier Transform Holography. In some embodiments, the computer generated hologram is presented on a spatial light modulator (e.g., operating in phase-modulation mode). Alternatively, the computer generated hologram is a film applied to an optical element. Computer generated holography digitally generates a holographic interference pattern and applies the generated pattern to an optical element, such as the diffractive optical element 430. Various methods may be used to encode the diffractive optical element 430 with the 2D Fourier Transform of the plurality of clusters, examples of which are described in: Brown, Byron R.; Lohmann, Adolf W., "Complex spatial filtering with binary masks," Applied Optics (Optical Society of America) Volume 5, Number 6, June 1966; and J. J. Burch (1967); and "A Computer Algorithm for the Synthesis of Spatial Frequency Filters," Proceedings of IEEE (IEEE) 55: 599-601; Burrchardt, C. B., "A Simplification of Lee's Method of Generating Holograms by Computer," Applied Optics, Volume 9, Number 8, August 1970; Lee, Wai Hon, "Sampled Fourier Transform Hologram Generated by Computer," Applied Optics, Volume 9, Number 3, March 1970, Lohmann, A. W., Paris, D. P. "Binary Fraunhofer Holograms, Generated by Computer," Applied Optics, Volume 6, Number 10, October 1967, Lohmann, A. W., Sinzinger, S. "Graphic Codes for Computer Holography," Applied Optics, Volume 34, Number 17, June 1995, which are all hereby incorporated by reference in their entirety. FIG. 4 includes a representation of an example diffractive optical element 430 that is a 2D Fourier transform of the plurality of clusters. For purposes of illustration, a portion 440 of the diffractive optical element 430 is magnified to better illustrate encoding of the diffractive optical element 430. The vertical bars shown in the magnified portion 440 of the diffractive optical element 430 are representative of a Fourier transform of a single cluster whose amplitude and phase information have been quantized and encoded onto the portion 440 of the diffractive optical element 430.

The diffractive optical element 430 attenuates optical power less than a mask, which is an inverse of the desired image in the far field. For example, the desired image in the far field is a plurality of clusters including one or more illuminated regions, so a mask for the desired image is transparent in locations corresponding to the illuminated regions and is opaque in other locations. For example, FIG. 4 shows a portion of a mask 450 corresponding to a single cluster. However, in practice, a mask blocks a significant portion of light, which wastes a large portion of optical power. As shown in FIG. 4, the magnified portion 440 of the diffractive optical element 430 blocks significantly less light than the portion of the mask 450 and also corresponds to a single cluster. Accordingly, using a diffractive optical element 430 reduces the optical power needed to produce clusters 442 relative to use of a mask.

The transform assembly 440 takes an inverse Fourier transform of light 432 output from the diffractive optical element 430 to generate a plurality of clusters 442, and projects the plurality of clusters 442 into a local area including the sparse projector 400. For example, the transform assembly 440 includes a transform lens and a projection component. The transform lens is a positive lens that takes a 2D inverse Fourier transform of the output 432 from the diffractive optical element 430 and outputs an image of a plurality of clusters 442 as it would appear in a far field at a back focal plane of the transform lens. As noted above, in some embodiments, multiple diffractive optical elements 430 that correspond to different sets of clusters may be illuminated at the same time, so in some instances the transform assembly 440 causes the sets of clusters to be superimposed in the far field.

The projection component of the transform assembly 440 projects the image of the clusters 442 over a large field of view (e.g., ~a hemisphere) into the local area. In various embodiments, the projection component includes one or more lenses that are positioned in relation to the image of the clusters 442 to project the clusters 442 over a large field of view. In some embodiments, a fish eye optic is used so the field of view on which the clusters 442 are projected approaches a hemisphere (e.g., 180 degrees). Additionally, in some embodiments, one or more filters and/or baffles may be used to block lower order representations of the image of the clusters 442 from being projected into the local area.

Figure 5:
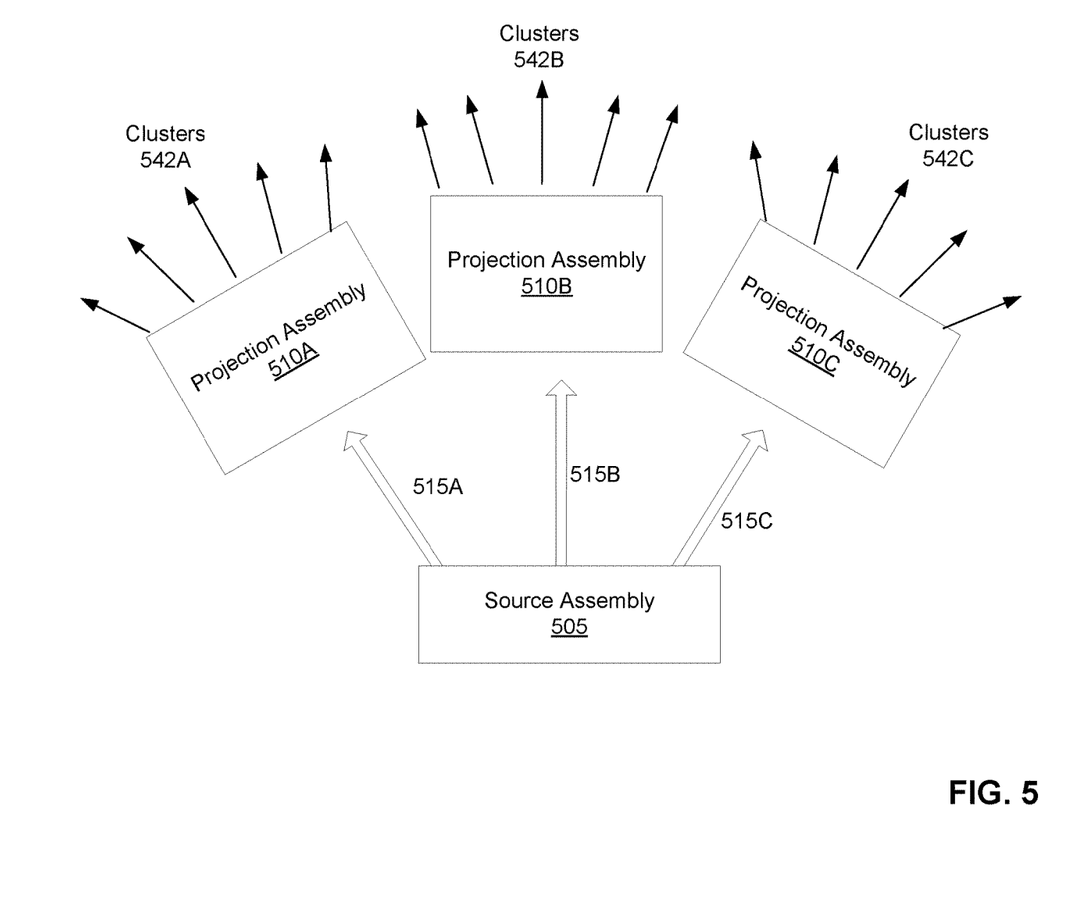
FIG. 5 is a block diagram of a sparse projector including multiple projection assemblies, in accordance with an embodiment.

FIG. 5 is a block diagram of an embodiment of a sparse projector 500 including multiple projection assemblies 510A, 510B, and 510C. In the example shown by FIG. 5, the sparse projector 500 includes a source assembly 505 and projection assemblies 510A, 510B, and 510C. The source assembly 505 is substantially similar to the source assembly 405, which is described above in conjunction with FIG. 4; however, the source assembly 505 is configured to output multiple beams of light 515A, 515B, 515C instead of a single beam of light. In some embodiments, different beams of light 515A, 515B, 515C output by the source assembly 505 are in the same ranges of wavelengths. Alternatively, different beams of light 515A, 515B, 515C output by the source assembly 505 are in different ranges of wavelengths.

The projection assemblies 510A, 510B, and 510C are each substantially similar to the projection assembly 410 described above in conjunction with FIG. 4. In some embodiments, each of the projection assemblies 510A, 510B, and 510C include different diffractive optical elements, so each projection assembly 510A, 510B, and 510C outputs a different set of clusters 542A, 542B, and 542C, respectively. Additionally, each cluster within each set of clusters 542A, 542B, and 542C is unique, so a specific cluster appears a single time in the set of clusters 542A, 542B, and 542C. In alternate embodiments, the diffractive optical element in each of the projection assemblies 510A, 510B, and 510C is the same, but each projection assembly 510A, 510B, 510C is illuminated using a different range of wavelengths. For example, beam of light 515A is a particular range of wavelengths, beam of light 515B is a different range of wavelengths, and beam of light 515C is another range of wavelengths. Accordingly, clusters in different sets of clusters 542A, 542B, and 542C may have the same spatial configuration, but have different reflectance types; thus, each cluster in the sets of clusters 542A, 542B, 542C, still has a unique location configuration.

Using multiple projection assemblies 510A, 510B, and 510C allows an increase in the density of clusters in sets of clusters 542A, 542B, and 542C within their respective fields of view of the projection assemblies 510A, 510B, and 510C (~60 degrees each), because a given set of clusters 542A, 542B, and 542C is not spread across the total field of view (e.g., ~180 degrees) of the sparse projector 500. In contrast, the projection assembly 410 in FIG. 4 outputs a single set of clusters 442 over the same field of view (e.g., ~180 degrees). Accordingly, the distance between adjacent clusters in the sets of clusters 542A, 542B, and 542C is smaller, potentially allowing a more accurate virtual mapping of the local area.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
a sparse projection system configured to:
generate a plurality of clusters using one or more diffractive optical elements, each cluster having a unique configuration that corresponds to a unique location in a virtual mapping of a local area, and
project the generated clusters throughout the local area; and
a virtual reality (VR) headset comprising:
an imaging device configured to capture a series of images of portions of the local area, at least one image including at least one cluster, and
an electronic display configured to output video information based at least in part on the virtual mapping of the local area; and
a VR console comprising:
a processor; and
a memory coupled to the processor and including instructions that, when executed by the processor, cause the processor to:
receive the series of images from the imaging device;
determine a location of the VR headset within the virtual mapping of the local area based at least in part on a configuration of the at least one cluster;
generate content based at least in part on the determined location of the VR headset within the virtual mapping of the local area; and
provide the content to the VR headset for presentation by the electronic display.

2. The system of claim 1, wherein a diffractive optical element of the one or more diffractive optical elements, is a computer generated hologram, and the sparse projection system is configured to generate a plurality of clusters by performing an inverse Fourier transform of light output from the diffractive optical element.

3. The system of claim 1, wherein the unique configuration for a given cluster is a combination of a spatial configuration that describes a number and arrangement of illuminated regions within the given cluster and a reflectance type that specifies a band of light used to generate the given cluster.

4. The system of claim 3, wherein the sparse projection system comprises:
a source assembly configured to generate a beam of light and an additional beam of light;
a projection assembly configured to:
generate a set of clusters of the plurality of clusters using a diffractive optical element of the one or more diffractive optical elements and the beam of light, and
project the generated set of clusters throughout a portion of the local area; and
a second projection assembly configured to:
generate an additional set of clusters of the plurality of clusters using an additional diffractive optical element of the one or more diffractive optical elements and the additional beam of light, and
project the generated additional set of clusters throughout an additional portion of the local area.

5. The system of claim 4, wherein the beam of light and the additional beam of light have different wavelengths and a reflectance type associated with the set of clusters is different from a reflectance type associated with the additional set of clusters.

6. The system of claim 5, wherein the diffractive optical element and the additional diffractive optical elements are configured such that spatial configurations for the first set of clusters are the same as spatial configurations for the additional set of clusters.

7. The system of claim 4, wherein the beam of light and the additional beam of light are configured such that a reflectance type associated with the set of clusters is the same as a reflectance type associated with the additional set of clusters.

8. The system of claim 7, wherein the diffractive optical element and the additional diffractive optical element are different, and spatial configurations for the set of clusters differ from spatial configurations for the additional set of clusters.

9. A system comprising:
    a sparse projection system comprising:
        a source assembly configured to generate one or more beams of light, and
        a projection assembly configured to:
            generate a plurality of clusters using a diffractive optical element and a beam of the one or more beams of light, each cluster having a unique configuration that corresponds to a unique location in a virtual mapping of a local area, and
            project the generated clusters throughout the local area; and
    a virtual reality (VR) headset comprising
        an imaging device configured to capture a series of images of portions of the local area, at least one image including at least one cluster, and
        an electronic display configured to output content based at least in part on the virtual mapping of the local area; and
    a VR console comprising:
        a processor; and
        a memory coupled to the processor and including instructions that, when executed by the processor, cause the processor to:
            receive the series of images from the imaging device;
            determine a location of the VR headset within the virtual mapping of the local area based at least in part on a configuration of the at least one cluster;
            generate content based at least in part on the determined location of the VR headset within the virtual mapping of the local area; and
            provide the content to the VR headset for presentation by the electronic display.

10. The system of claim 9, wherein the diffractive optical element is a computer generated hologram, and the sparse projection system is configured to generate the plurality of clusters by performing an inverse Fourier transform of light output from the diffractive optical element.

11. The system of claim 9, wherein the unique configuration for a given cluster is a combination of a spatial configuration that describes a number and arrangement of illuminated regions within the given cluster and a reflectance type that specifies a band of light used to generate the given cluster.

12. The system of claim 11, wherein the sparse projection system further comprises:
    an additional projection assembly configured to:
        generate an additional plurality of clusters using an additional diffractive optical element and an additional beam of light of the one or more beams of light, and
        project the generated additional plurality of clusters throughout the local area.

13. The system of claim 12, wherein the beam of light and the additional beam of light are different wavelengths such that a reflectance type associated with the plurality of clusters is different from a reflectance type associated with the additional plurality of clusters.

14. The system of claim 13, wherein the diffractive optical element and the additional diffractive optical element are the same, and spatial configurations for the plurality of clusters and spatial configurations for the additional plurality of clusters are the same.

15. The system of claim 12, wherein the beam of light and the additional beam of light are the same such that a reflectance type associated with the set of clusters is the same as a reflectance type associated with the additional set of clusters.

16. The system of claim 15, wherein the diffractive optical element and the additional diffractive optical element are different, and spatial configurations for the plurality of clusters and spatial configurations for the additional plurality of clusters are different.

17. A system comprising:
    a sparse projection system comprising:
        a source assembly configured to generate one or more beams of light, and
        a projection assembly configured to:
            generate a plurality of clusters using a diffractive optical element and the one or more beams of light, each cluster including one or more illuminated regions of light within a respective portion of a local area and each illuminated region of light corresponds to a diffracted beam of light, the one or more illuminated regions of light of each cluster having a unique configuration that corresponds to a unique location in a virtual mapping of the local area, and
            project the generated clusters throughout the local area; and
    a VR console comprising:
        a processor; and
        a memory coupled to the processor and including instructions that, when executed by the processor, cause the processor to:
            receive the series of images from an imaging device of a VR headset, at least one image including at least one cluster;
            determine a location of the VR headset within the virtual mapping of the local area based at least in part on a configuration of the at least one cluster;
            generate content based at least in part on the determined location of the VR headset within the virtual mapping of the local area; and
            provide the content to the VR headset for presentation by the electronic display.

18. The system of claim 17, wherein a diffractive optical element of the one or more diffractive optical elements is a computer generated hologram, and the sparse projection system is configured to generate the plurality of clusters by taking an inverse Fourier transform of light output from the diffractive optical element.

19. The system of claim 17, wherein the sparse projection system further comprises:

an additional projection assembly configured to:
   generate an additional set of clusters of the plurality of clusters using an additional diffractive optical element of the one or more diffractive optical elements and the additional beam of light, and
   project the generated additional set of clusters throughout an additional portion of the local area.

20. The system of claim 17, wherein the unique configuration for a given cluster is a combination of a spatial configuration that describes a number and arrangement of illuminated regions within the given cluster and a reflectance type that specifies a band of light used to generate the given cluster.

21. A method comprising:
   generating, by a sparse projection system, a plurality of clusters using one or more diffractive optical elements, each cluster having a unique configuration that corresponds to a unique location in a virtual mapping of a local area;
   projecting, by the sparse projection system, the clusters throughout the local area;
   capturing, by an imaging device of a virtual reality (VR) headset, a series of images of portions of the local area, at least one image including at least one cluster;
   outputting, by the VR headset, video information based at least in part on the virtual mapping of the local area;
   receiving, by a processor of a VR console, the series of images from the imaging device;
   determining, by the processor, a location of the VR headset within the virtual mapping of the local area based at least in part on a configuration of the at least one cluster;
   generating, by the processor, content based at least in part on the determined location of the VR headset within the virtual mapping of the local area; and
   providing, by the processor, the content to the VR headset for presentation.

22. The method of claim 21, wherein a diffractive optical element of the one or more diffractive optical elements, is a computer generated hologram, and wherein generating a plurality of clusters comprises performing an inverse Fourier transform of light output from the diffractive optical element.

23. The method of claim 21, wherein the unique configuration for a given cluster is a combination of a spatial configuration that describes a number and arrangement of illuminated regions within the given cluster and a reflectance type that specifies a band of light used to generate the given cluster.

24. The method of claim 23,
   wherein generating a plurality of clusters comprises:
      generating a beam of light and an additional beam of light;
      generating, by a diffractive optical element of the one or more diffractive optical elements, a set of clusters of the plurality of clusters using the beam of light, and
      generating, by an additional diffractive optical element of the one or more diffractive optical elements, an additional set of clusters of the plurality of clusters using the additional beam of light;
   wherein projecting the plurality of clusters comprises:
      projecting the set of clusters throughout a portion of the local area, and
      projecting the additional set of clusters throughout an additional portion of the local area.

25. The method of claim 24, wherein the beam of light and the additional beam of light have different wavelengths and a reflectance type associated with the set of clusters is different from a reflectance type associated with the additional set of clusters.

26. The method of claim 25, wherein spatial configurations for the first set of clusters are the same as spatial configurations for the additional set of clusters.

27. The method of claim 24, wherein the beam of light and the additional beam of light are configured such that a reflectance type associated with the set of clusters is the same as a reflectance type associated with the additional set of clusters.

28. The method of claim 27, wherein the diffractive optical element and the additional diffractive optical element are different, and spatial configurations for the set of clusters differ from and spatial configurations for the additional set of clusters.

* * * * *